United States Patent [19]

Chierici

[11] 4,345,689

[45] Aug. 24, 1982

[54] COMPOSITE SPIN WELDED COUPLER CARRIER ASSEMBLY

[75] Inventor: Osvaldo F. Chierici, Geneva, Ill.

[73] Assignee: Holland Company, Aurora, Ill.

[21] Appl. No.: 139,439

[22] Filed: Apr. 11, 1980

[51] Int. Cl.³ .......................... B61G 9/22; B61G 7/10
[52] U.S. Cl. ...................................... 213/61; 213/60; 308/3 R
[58] Field of Search ................... 213/21, 51, 60, 62 R; 105/199 C, 199 CB, 225; 308/3 R

[56] References Cited

U.S. PATENT DOCUMENTS

| 4,010,853 | 3/1977 | Adler | 213/61 |
| 4,055,254 | 10/1977 | Chierici et al. | 213/61 |
| 4,120,404 | 10/1978 | Chierici et al. | 213/61 |
| 4,133,434 | 1/1979 | Chierici | 213/61 |
| 4,192,240 | 3/1980 | Korpics | 105/225 |
| 4,238,039 | 12/1980 | Cooper et al. | 213/21 X |

FOREIGN PATENT DOCUMENTS

2017612 10/1979 United Kingdom ................. 213/61

Primary Examiner—Randolph A. Reese
Attorney, Agent, or Firm—McWilliams, Mann & Zummer

[57] ABSTRACT

A composite coupler carrier assembly for railroad cars comprising a lower metallic attachment plate shaped and arranged to be mounted on the car structure supporting the coupler shank, and an upper planar polymeric bearing body of ultra high molecular weight polyethylene that defines an upwardly facing planar bearing surface on which the coupler shank rides. The metallic attachment plate and the polymeric bearing body are fixed to each other by the practice of a spin welding technique involving the forming of a plurality of apertures of frusto-conical edging in the attachment plate, in which the small sides of the apertures are on the same side of the plate, and placing the underside of the polymeric bearing body against said side of the mounting plate, and spin welding in each aperture, to the bearing body, a polymeric disc that is of the same material as the bearing body, and that is proportioned to thereby anchor the attachment plate to the bearing body.

5 Claims, 13 Drawing Figures

COMPOSITE SPIN WELDED COUPLER CARRIER ASSEMBLY

This invention relates to coupler carriers for railroad cars, and more particularly, to a composite coupler carrier arrangement for use as a coupler carrier in any one of the commonly encountered type of coupler applications, such as AAR standard type E and F coupler applications, or in coupler applications for caboose cars.

Couplers of railroad cars are commonly operatively connected to the car and associated with the well known striker casting that is fixed to the projecting end of the car center sill at the car end in question. The striker castings involved are normally of open centered configuration defining the usual striking face disposed in a vertical plane, with the coupler shank extending through the casting and having affixed to the underside of same a wear plate that rests on the so-called coupler carrier that is supported by the striker casting at the threshold of the striker casing window opening.

Coupler carriers used in standard AAR type E coupler applications and similar coupler applications normally comprise a stationary metallic wear plate applied to the lower or threshold side of the striker casting window. Coupler carriers used in the resiliently supported type of coupler carrier, or which the standard AAR type F interlocking coupler application is an example, involve a familiar carrier iron that is secured on top of a carrier casting that is in turn resiliently supported in a striker casting cage that is defined by an upwardly facing socket in the lower side of the striker casting at the threshold of the striker casting window opening.

Illustrations of typical AAR type E coupler applications are shown at pages S8-10 and S8-11 of the 1974 Edition of Car & Locomotive Encyclopedia published by Simmons-Boardman Publishing Company, while typical AAR type F interlocking coupler applications are shown at pages S8-20 and S8-21 of the same publication.

In either case, conventionally the member or part on which the coupler shank wear plate rides has been a metallic plate, that is, the metal plate known as the coupler carrier in AAR type E and similar coupler applications, and the familiar carrier iron in AAR type F interlocking coupler and similar applications. The coupler shank wear plate is a hardened steel wear plate that heretofore by its nature has been a wear-away item conventionally requiring periodic replacement even under the best of circumstances, with consequent shopping of the car being necessary and all the other processing and costs involved that are all too well known to those in the railroad field concerned with car maintenance.

More recently, coupler support devices have been offered that have involved or include a polymeric bearing member on which the coupler shank rides. An example is the Applicant's snap-on coupler bearing plate arrangement that is disclosed in the Applicant's U.S. Pat. No. 4,133,434, granted Jan. 9, 1979. The bearing plate of this patent is of one piece construction formed from an ultra high molecular weight polymer of dry self lubricating characteristics, that is shaped specifically for application to the carrier iron of the aforementioned resiliently supported type coupler carriers.

The Applicant, in working with this type of device for making available to the railroad industry coupler shank support members formed from the ultra high molecular weight polymer disclosed in said patent for incorporation in the various types of coupler applications in general use, has found that while the coupler shank support member may be of one piece all polymeric or plastic construction, it has to be made available in a number of different shapes and configurations to accomodate routine incorporation in the various coupler applications in use. This has required providing this form of coupler carrier in a number of different shapes and sizes, with resulting complications in manufacturing and application procedures and techniques, and undesirable inventory stocking problems.

A principal object of the present invention is to provide a composite coupler carrier arrangement or device that permits the polymer coupler shank support or bearing plate to be of simplified planar or flat plate configuration, and that involves the coupling of the polymeric plate to a separate metallic attachment or mounting plate that is shaped and arranged to provide for effective mounting of the carrier in its operative position as called for by the specific coupler application involved.

Another principal object of the invention is to provide a composite coupler carrier device or arrangement of the type indicated that involves a polymeric coupler shank support or bearing plate or member being affixed to its metallic mounting plate free of separate bonding substances or metallic attachment devices.

Another principal object of the invention is to provide a composite coupler carrier of the type indicated in which the metallic mounting plate is spin welded to the polymeric coupler shank support or bearing plate in a manner that results in the two components being integrated as a two part assembly despite the dissimilar nature of the materials forming the two parts involved that precludes the use of conventional ways of fastening metallic parts together.

Another important object of the invention is to provide a method of and means for spin welding a metallic plate to a polymeric plate.

Still other objects of the invention are to provide a composite coupler carrier arrangement that is of few and simple parts, that permits the polymeric component of the carrier to be of simple planar plate type shape, that permits anchoring of the carrier in place by using conventional welding techniques of the metallic attachment plate, or providing the metallic attachment plate with securing tabs, and that provides a coupler carrier that is economical to manufacture, easy to install, and trouble free and long lived in use.

In accordance with the invention, a composite coupler carrier device or arrangement is provided that is adapted for application to coupler applications without removing the coupler, and which contemplates that the coupler shank support component is a polymeric bearing member or plate that provides the benefits described in the Applicant's said patent, with the coupler shank bearing member or plate being fixed to the metallic application plate of the assembly that is shaped for securement of the assembly in its operating position at points spaced from the margin of the polymeric bearing plate. The polymeric bearing plate is of planar configuration and is preferably formed from an ultra high molecular weight polyethylene of dry self lubricating characteristics to define the load support surface of the polymeric bearing plate. The polymeric bearing plate rests in overlying relation to the metallic mounting plate and against one side of the mounting plate. The polymeric plate and the metallic mounting plate are integrated or fixed together without employing any bonding substance or metallic securing devices by employing a special spin welding technique devised by the Applicant for this purpose.

In practicing the spin welding technique, the attachment plate has a planar portion against which the polymeric bearing plate is applied, with such portion of the attachment plate being formed with a plurality of spaced apart apertures of circular outline each having a side wall composite surfacing that is largely other than right configuration, for instance frusto-conical configuration, with the shaping being such that the indicated apertures each form marginal edgings on either side of the mounting plate of which one of said marginal edgings is of less diameter than the aperture other marginal edging. The apertures are oriented such that the smaller marginal edgings of same are on the side of the mounting plate against which the polymeric plate is secured.

The two components are assembled by resting the polymeric bearing plate in inverted position on a fixed support, and placing the metallic mounted plate on top of same in centered relation thereto and so disposed that the indicated aperture smaller marginal edgings are on the side of the mounting plate that engages the polymeric bearing plate.

As to each aperture involved in the mounting plate, a polymeric disc of the same composition as the bearing plate and having a thickness that somewhat exceeds that of the mounting plate and diameter equalling the smaller aperture edging is placed in the aperture on the exposed bearing plate undersurface. The polymeric bearing disc is then pressed against the bearing plate by a rotatably mounted disc configured tool that keys itself to the disc, with the tool being rotated relative to the bearing plate and mounting plate, about the axis of the disc, to, through friction fluidize the interface between the disc and the polymeric bearing plate surface involved and effect radial outward flow of the disc into direct contact bearing relation with the mounting plate aperture edging, for making the disc integral with the bearing plate surface involved and keying the bearing plate to the mounting plate by means of the disc that is now an integral part of the bearing plate, and has a thickness or depth approximating that of metal mounting plate.

The mounting plate apertures are conveniently of the same maximum and minimum diametrical configuration with a frusto-conical configuration on the wide side of same being preferred that is also preferably angled at about 45 degrees that merges into a short cylindrical wall surfacing on the narrow side of the aperture. The number of mounting plate apertures and corresponding securing discs involved is optional, but the number should be more than one for providing at least a two point anchoring of the polymeric bearing plate to the metallic mounting plate.

The metallic mounting plate in one embodiment is of planar plate configuration and has a length longer than that of the polymeric bearing plate, with the latter being centered thereon, to provide mounting plate end portions or extensions that accommodate welding of the mounting plate to the striker casting support structure involved.

The metallic mounting plate, instead of being arranged for weld type securement, may alternately be formed with laterally extending tabs that are shaped to secure the mounting plate to the striker casting supporting structure that is to be employed. In such case, the mounting tabs that are on the side of the mounting plate to be disposed inwardly of the striker casting are formed in the plane of the mounting plate so that the coupler carrier assembly involved may be in mounted position under the coupler shank by merely lifting the coupler, after which the inwardly projecting tabs are deformed downwardly. The outwardly projecting tabs may be preformed at right angled relation, or also be coplanar with the mounting plate and deformed into angled relation on application.

As the welded application form of the invention is also applied to the coupler application in question by lifting the coupler shank as needed to put it in place, it will be seen that the invention contemplates that in addition to standardizing coupler carrier construction, removal of the coupler to apply the coupler carrier is also avoided.

Other objects, uses and advantages will be obvious or become apparent from a consideration of the following detailed description and the application drawings in which like reference numerals are employed to indicate like parts throughout the several views.

However, it is to be distinctly understood that the specific drawing illustrations provided are supplied primarily to comply with the requirements of the Patent Laws, and that the invention is susceptible of modifications that will be obvious to those skilled in the art, and that are intended to be covered by the appended claims.

GENERAL DESCRIPTION

Referring first to FIGS. 1-4, these figures diagrammatically illustrate the relevant car components to which the coupler carrier of the present invention may be typically applied, these figures illustrating the center sill 10 of a conventional railroad freight car frame 11, each end 13 of which is arranged to provide or define a draft gear pocket 12 below which is mounted a carrier iron 14 riveted to the center sill at 16 to support conventional draft gear 18 in the draft gear pocket 12, in accordance with standard practices. The draft gear 18 and front follower 20 are conventionally applied to vertical yoke 22 that is conventionally connected to the shank 26 of coupler 28 by the usual draft key 39 positioned in slots 24 formed in the yoke 22. The coupler shank 26, which is shown only in phantom, is conventionally similarly slotted to receive the draft key as is conventional. The center sill ends 13 are equipped with a striker casting 21 suitably secured in place that is positioned to be engaged by the coupler horn 30. Opposed pairs of stop lugs 32 and 34 are affixed to the center sill 10 at either end of the draft gear pocket, with the inner end of the draft gear 18 being in contact with the inner lugs 32, while the front follower 20 is in contact with the outer lugs 34 when the gear is in its neutral position (not subjected to either draft or buffing forces). The coupler shank 26 is equipped with the usual hardened wear plate that is indicated at 33 in FIGS. 3-5.

The striker casting 21, as is conventional, comprises the usual striker portion 36 having the planar striking face 38 which is what is engaged by the coupler horn to limit buff movement of the coupler. The striker portion 36 is of generally planar configuration and defines an open center or window 40 through which the coupler shank 26 extends for connection to the yoke, and thus to the car center sill 10 through draft gear 18.

The striker casting window 40 is defined by striker header section 42, spaced vertical side sections 44 and 46, and threshold section 48 integrally united in the form of the conventional striker casting 21 and suitably fixed to the car center sill end 13 in any conventional manner.

The coupler application diagrammatically illustrated in FIGS. 1-4 generally is representative of the AAR type E coupler application in which the portion of the coupler shank that extends through the striker casting window opening is not resiliently supported, but rather is supported by the familiar metallic coupler carrier (on which wear plate 33 rides), which carrier in accordance with the present invention is replaced by the special composite coupler carrier 50 that is applied to the striker casting threshold section 48 where indicated in FIGS. 1-4. It should be noted, in this connection, that the conventional threshold section of striker castings of the type illustrated are formed to define a horizontal ledge 52 that is integral with the striker casting and extends crosswise of the center line of draft 53. Ledge 52 also projects inwardly of the striker casting window toward the draft gear pocket and defines upwardly facing horizontally disposed substantially flat or planar surface 54 to which the conventional metallic coupler carrier is normally applied.

The coupler carrier 50 itself generally comprises metallic base plate 56, formed from a suitable steel or the like, having a planar body 57 which is integrated with polymeric bearing member 58 which takes the form of a generally planar polymeric plate 60 defining planar upwardly facing bearing surface 61 on which the coupler shank wear plate rides.

The bearing member 58 is preferably formed from the same material as the corresponding coupler shank bearing plate disclosed in my said U.S. Pat. No. 4,133,434 (the disclosure of which is hereby incorporated herein by this reference); thus, bearing member is formed from a ultra high molecular weight (UHMW) polyethylene having a molecular weight in the range from about 3,000,000 to about 9,000,000. One polyethylene material suitable for this purpose is molecularly oriented UHMW polyethylene marketed by Ketrol Enterprises of York, Pa. under the trademark TUFLAR (Grade PL).

The material specified for making the bearing body 58 is high density polymer of dry self lubricating characteristics that is sufficiently compaction resistant to resist any substantial compaction under compressive forces up to its elastic limit, and has a high degree of elastic memory for full return to original shape after being stressed, up to its elastic limit. This material also has a high degree of toughness and long wearing characteristics, resistant to adherence thereof of foreign matter, and is also receptive to fillers in the form of glass, clay, sand, suitable fabrics, and aluminae, for modifying same to adapt same for special conditions. This material has a coefficient of sliding or dynamic friction with respect to steel of about 0.15.

Utilization of the bearing member 58 for supporting the coupler shank 26 thus provides the advantages outlined in detail in my said U.S. Pat. No. 4,133,434, whereby wear on the coupler shank wear plate is eliminated, with consequent relieving of the railroads of coupler shank wear replacement problems due to the wearing out of the shank wear plate.

Figure 1:
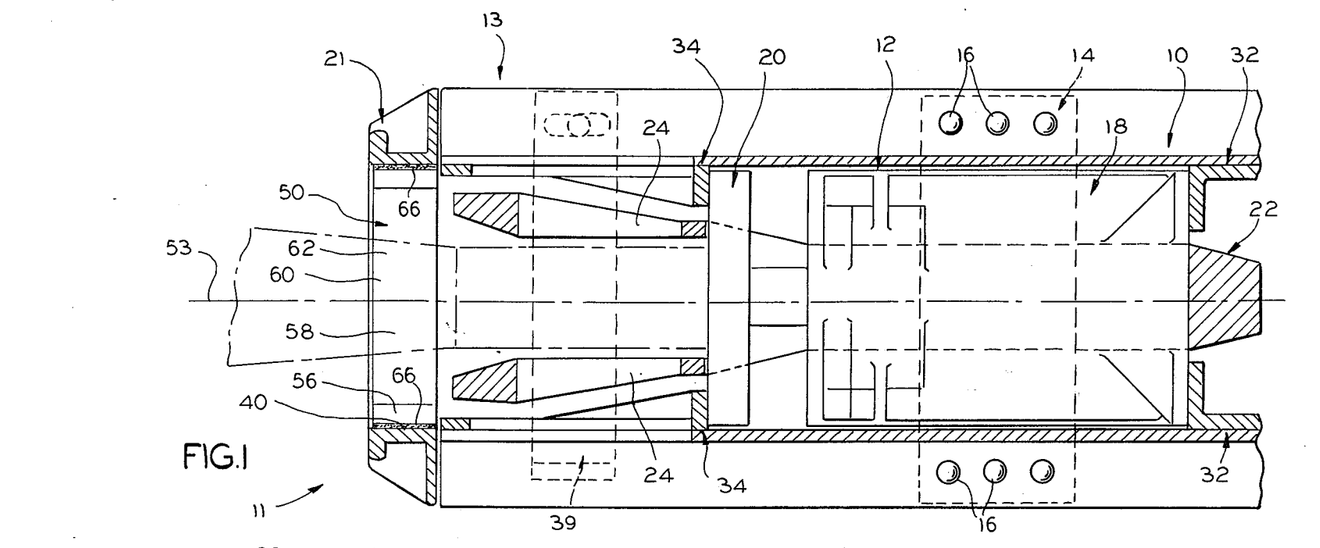
FIG. 1 is a horizontal section through familiar parts of a coupler mounting arrangement of a freight car, with the coupler and coupler key shown in dashed lines and illustrating in plan one embodiment of a composite coupler carrier arrangement in accordance with the present invention.
Figure 2:
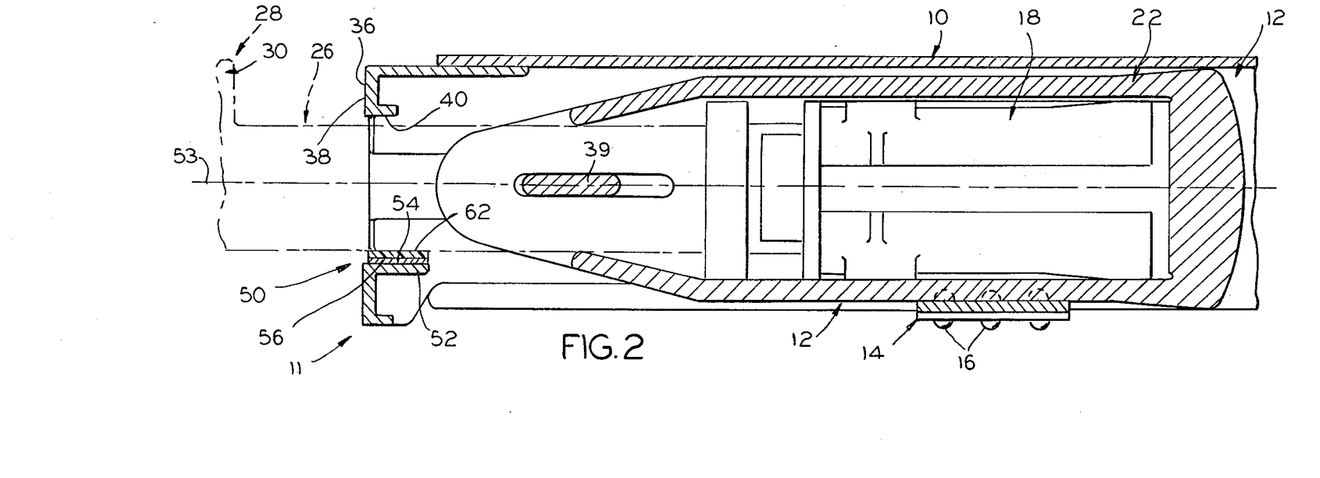
FIG. 2 is a vertical section through the freight car components shown in FIG. 1, with the coupler shown in dashed lines.
Figure 3:
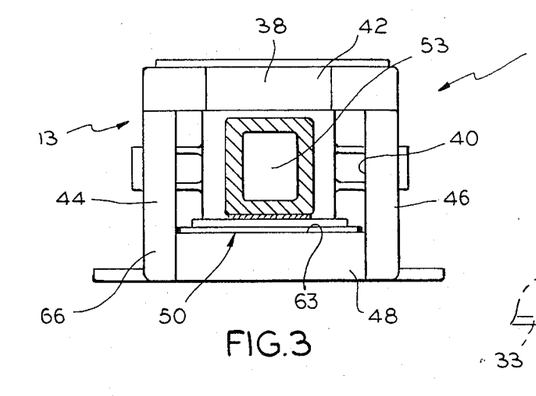
FIG. 3 is an end view of the striker and associated parts shown in FIGS. 1 and 2 taken from the left hand side of FIG. 2, with the coupler shank shown in section.
Figure 4:
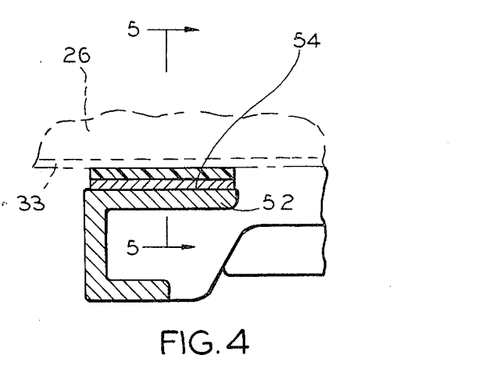
FIG. 4 is a fragmental view showing the composite coupler carrier as shown in FIG. 2, but on an enlarged scale.
Figure 5:
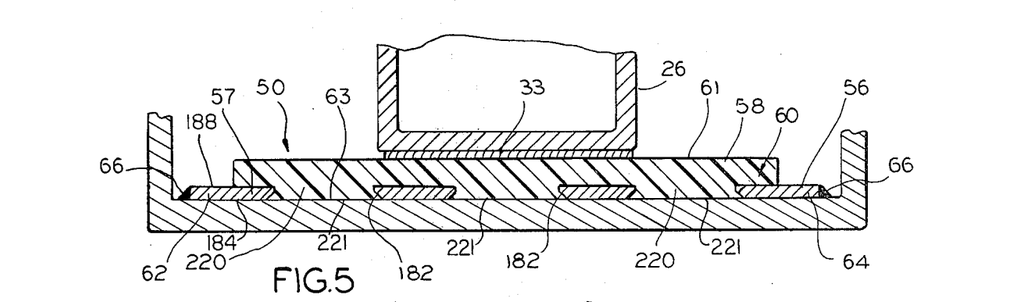
FIG. 5 is a fragmental vertical cross-sectional view taken substantially along line 5—5 of FIG. 4, showing also the coupler shank and its wear plate in section.

In accordance with this invention, the bearing member 58 and the mounting plate 56, and specifically its planar body 57, are integrated for securement together without employing bonding substances or mechanical fasteners, by the practice of the spin welding technique hereinafter described. In the form of the coupler carrier 50 shown in FIGS. 1-5, the mounting plate 56 is longer in length than the bearing plate 60, with the bearing plate 60 being centered thereon and thus spaced from laterally extending end portions 62 and 64 of the plate 56. The mounting plate 56 of body 57 defines upper and lower planar side surfaces 188 and 184, that parallel bearing surface 61 and the plane of bearing plate 60. The coupler carrier 50 is applied to the striker casting 21 without removing the coupler 28, by lifting the coupler sufficiently to remove the conventional metallic coupler carrier and slipping the coupler carrier 50 into place in substantially the positioning indicated in FIGS. 1-5, with the coupler carrier centered within the window 40 substantially as indicated in FIGS. 3 and 5, and the underside surface 184 of mounting plate body 57 seating flush against the planar horizontal surface 63 of the striker casting special section 48 (see FIGS. 3-5).

The laterally projecting end portions 62 and 64 of mounting plate 50 may then be fixed in place by welding where indicated at 66.

Where shims are required to properly position the coupler with respect to the center line of draft 53, they may be inserted under the plate 56 as needed. Such shims normally should have a length equivalent to that of plate 56 so that the plate 56 and shims can be welded in place by welding where indicated at 66.

Figure 6:
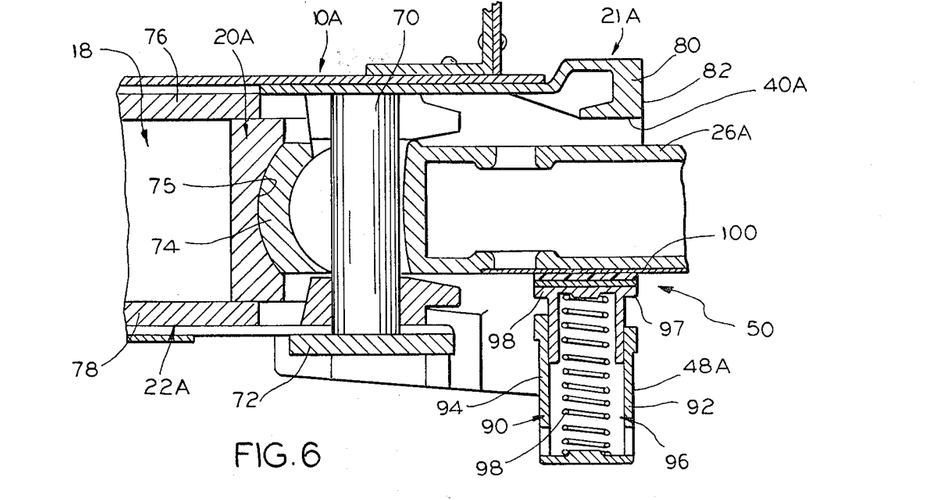
FIG. 6 is a vertical sectional view through an AAR type F interlocking coupler application, illustrating the composite coupler carrier of this invention applied thereto.

FIG. 6 illustrates the coupler carrier 50 applied to an AAR type F interlocking coupler application, the latter being the structural environment for the application of the snap-on coupler bearing plate disclosed in my said U.S. Pat. No. 4,133,434. In this type of coupler application, the striker casting 21A is applied to conventional center sill 10A. The striker casting 21A includes the usual forward draft gear stop lugs (not shown) against which is seated the usual front follower 20A that is operatively associated with conventional draft gear (not shown) mounted where indicated at 18A that has its other end seated against the usual rear stop lugs that are not shown in FIG. 6. The draft gear involved and its front follower 20A are embraced by the usual vertical yoke 22A which is connected to the shank 26A of the coupler (not shown in this figure) by connector pin 70 that is supported by support plate 72 that is suitably secured in place across the center sill at the level indicted. As usual, the spherically contoured inner end 74 of the coupler shank seats against the correspondingly contoured force transmitting recess 75 of the front follower 20A. The yoke 22A comprises the usual upper and lower straps or arms 76 and 78 that are suitably apertured to receive the connector pin 28, and which are integrally connected at the inner end of the yoke 22A in the usual manner (not shown).

The striker casting 21A comprises the usual vertically disposed striker portion 80 having the planar striking face 82 which is adapted to be engaged by the usual coupler head horn (not shown). The striker portion 80 is of generally planar configuration and defines an open center or window 40A through which the coupler shank 26A extends for connection to the yoke and thus to the car center sill through the draft gear, as is conventional.

The striker portion 80 of the striker casting 21A defines in coplanar relation therewith on the underside of same, in the threshold section 48A that corresponds to the threshold portion 48 of casting 21, a cage 90 defined by forward or outer wall 92 spaced from the rear or inner wall 94 and side walls (not shown), which in turn form the coupler carrier chamber 96 in which is resiliently mounted coupler carrier 98 that itself is entirely conventional and that is provided to resiliently support the coupler shank 26A by way of compression springs 98. The striker casting 50 and coupler carrier 97 may be of the specific types shown at page S8-19 of the aforementioned Edition of Car & Locomotove Cyclopeadia.

In the specific embodiment of FIG. 6, the composite coupler carrier 50 is applied to the horizontal load support surface 100 defined by load support platform 97 of coupler carrier 98, which now becomes the support structure for the coupler carrier 50 that provides the results described in my said U.S. Pat. No. 4,133,434. Coupler carrier 50 in the form of FIG. 6 is shown only in transverse section, but it has its ends 62 and 64 affixed to its support 97 by welding, in the same manner as shown in FIG. 5. Load support platform 97 is conventionally formed from metal, usually steel.

Figure 11:
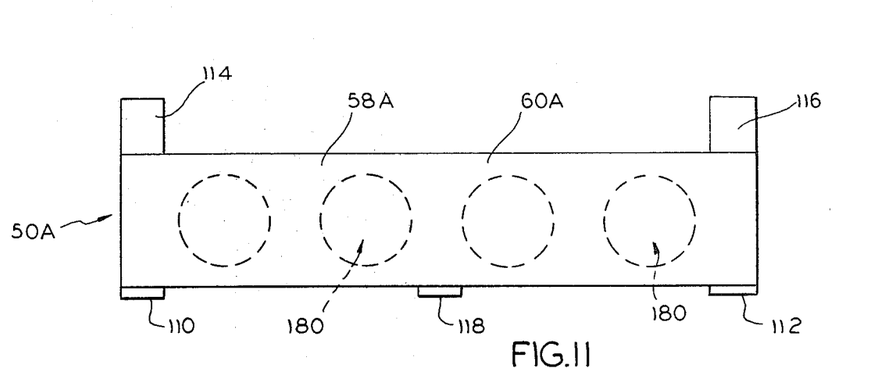
FIG. 11 is a top plan view illustrating a modified coupler carrier assembly in accordance with the invention.
Figure 12:
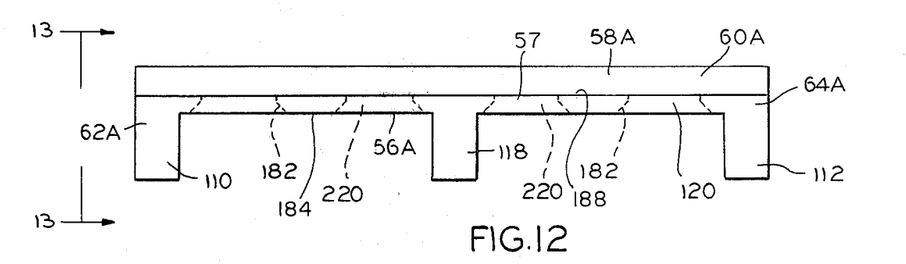
FIG. 12 is a front elevational view of the assembly shown in FIG. 11.
Figure 13:
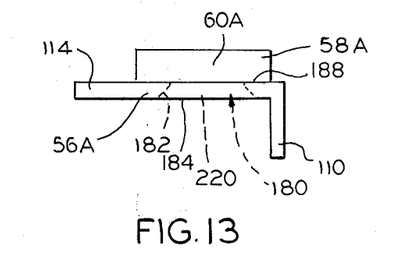
FIG. 13 is an end view of same, taken along line 13—13 of FIG. 12.

FIGS. 11-13 illustrate a modified form of coupler carrier 50A of which the principal variants from the carrier 50 is that mounting plate 56A at its ends 62A and 64A is formed with outer tabs 110 and 112 and inner tabs 114 and 116. An outer tab 118 may be also formed on the outer side edge 120 of the mounting plate 56A at its midportion.

In the coupler carrier 50A, the polymeric coupler bearing member 58A (which is formed from the same material as member 58) is of substantially the same length as the mounting plate 56A, and is in the form of bearing plate 60A connected with mounting plate 56A in the same manner as will be described hereinafter. The inner tabs 114 and 116 are formed to be in the plane of the mounting plate 56A, while the tabs 110, 112 and 118 are formed perpendicularly thereto, so that when the coupler 28 is lifted to apply the coupler carrier 50A in the position shown for coupler carrier 50 in FIGS. 1-4, the coupler carrier 50A may be inserted between the coupler shank and the striker casting ledge 52, with the downturned tabs 110, 112 and 118 serving as a movement stop when applying the coupler carrier 50A. Tabs 114 and 116 may then be formed downwardly against the rearwardly facing edge of the ledge 54 to secure the coupler carrier 50A to the striker casting, as by hammering or otherwise deflecting the tabs 114 and 116 to the positioning indicated. As in the case of coupler carrier 50, shims may be employed as needed under mounting plate 56A to properly align the coupler with the center line of draft 53.

MANNER OF SPIN WELDING COUPLER CARRIER COMPONENTS TOGETHER

FIGS. 7-10 illustrate diagrammatically the manner in which the coupler carrier polymeric bearing plate and metallic mounting plate of the invention are integrated together without employing bonding materials or mechanical fasteners. It may be noted at this point that the polymeric material specified for making the coupler bearing plate of this invention is highly resistant to foreign matter adhering thereto, which thus precludes the use of any substances known to the Applicant for bonding the metallic mounting plate to the polymeric bearing plate.

FIGS. 7-10 illustrate the manner of assemblying the coupler carrier 50 that is specifically illustrated in FIGS. 1-6, but it will be obvious that the same procedures may be employed to assemble the polymeric bearing plate 60A to the metallic mounting plate 56A of the coupler carrier 50A of FIGS. 11-13.

Figures 7, 8, 9:
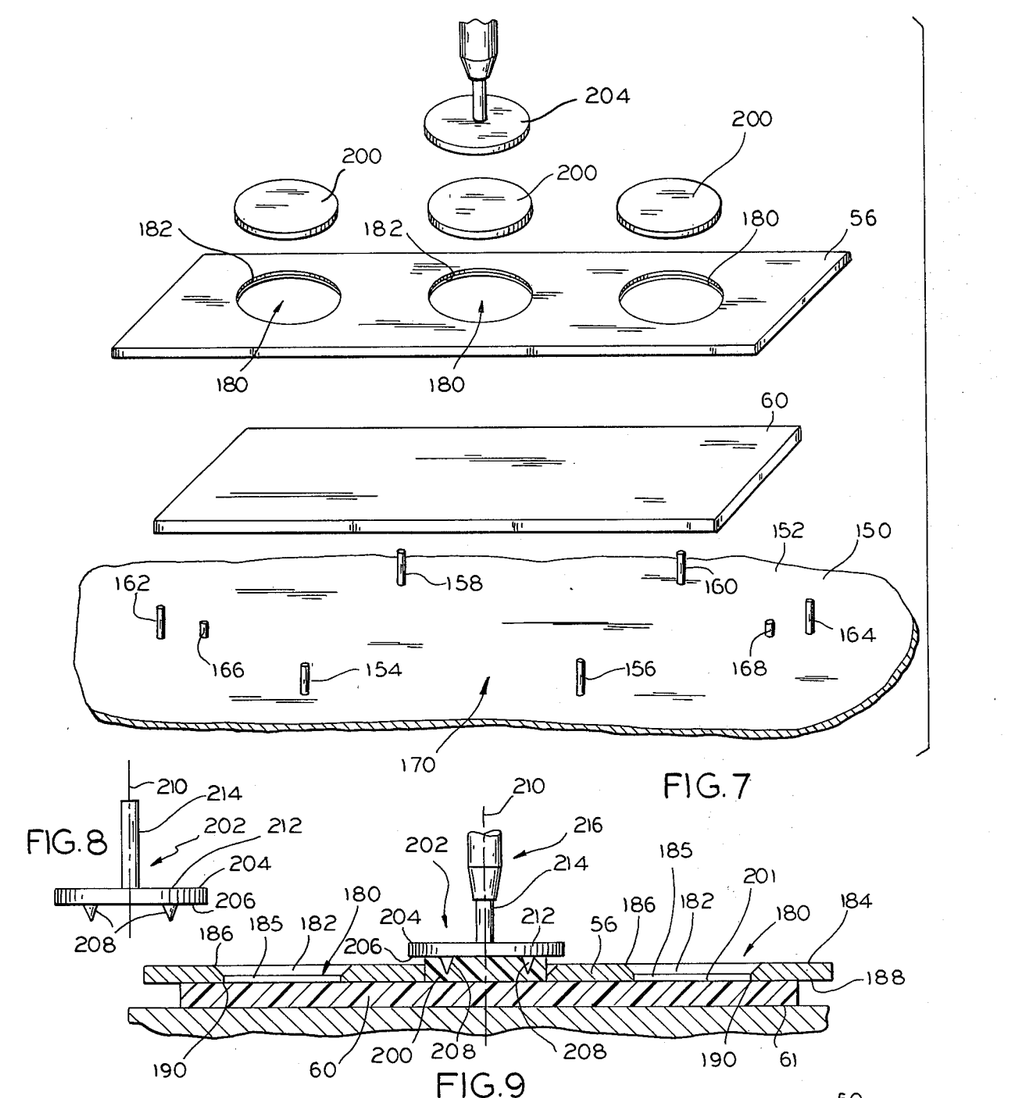
FIG. 7 is a diagrammatic exploded perspective view provided to diagrammatically illustrate the manner of joining the polymeric bearing plate and the metallic attachment plate of this invention, in accordance with a spin weld technique practiced in accordance with the invention.
FIG. 8 is a side elevational view of a spin pressure disc tool employed in connection with the spin weld aspect of this invention.
FIG. 9 illustrates the spin weld technique of this invention being applied to join the polymeric bearing plate and the metallic attachment plate of the coupler carrier assembly of this invention, with the parts involved being shown in vertical section.

In the shown of FIG. 7, reference numeral 150 indicates a work table 150 suitably supported and defining a planar or flat upwardly facing work surface 152 having mounted in fixed relation thereto six elongate dowel pins 154, 156, 158, 160, 162, and 164, and two shorter dowel pins 166 and 168. The dowel pins in question define an assembly space 170 to which the bearing plate 60 and the mounting plate 56 are applied.

The dowel pins 154 and 156 are positioned across the work space 170 from their corresponding dowel pins 158 and 160 the width of the two plates 56 and 60 so as to receive same therebetween in close fitting relation thereto. As indicated in FIGS. 4 and 6, plates 56 and 60 have the same width dimension. Dowels 166 and 168 are spaced from each other the length of the bearing plate 60 so as to receive same therebetween in close fitting relation thereto, with the dowel pins 166 and 168 having a height that does not exceed the thickness of the plate 60. Dowel pins 162 and 164 are spaced apart the length of the mounting plate 56 so as to receive same therebetween in close fitting relation thereto and are disposed so as to center the mounting plate 56 with respect to the bearing plate 60.

Plate 56, in accordance with the invention, is preferably preformed with two or more apertures 180 in spaced apart relation along the length of the plate 56. As is best shown in FIG. 9 (see also FIGS. 5 and 10), the apertures 180 are of special configuration. While they are each of circular outline of equivalent dimensioning, the apertures 180 are formed by shaping the plate 56 to define an aperture side wall surfacing 182 that is other than right in configuration, and preferably frusto-conical, as specifically illustrated in FIGS. 5, 9 and 10 for a substantial portion of the thickness of the plate 56, that merges at 183 into short cylindrical wall surfacing 185. Each aperture defining side wall surfacing 182 thus forms with the mounting plate under side surface 184 a marginal edging 186; similarly, the respective side wall surfacings 185 define with the top side surface 188 of the plate 56 marginal edging 190. The marginal edgings 186 and 190 are, of course, circular in configuration, with the marginal edgings 186 being on the same side 184 of the plate 56, while the marginal edgings 190 are on the opposite side 188 of plate 56.

It is preferred that the aperture defining side wall surfacings 182 be angled at approximately 45 degrees with respect to the plane of the plate 56, and that cylindrical surfacings 185 have an axial length that approximates one-third the thickness of plate 56; surfacings 182 and 185 may be formed by any suitable machining operation.

In assemblying the plates 56 and 60, the plate 60 is first placed between the plate side locating pins 154, 156, 158 and 160 and the plate end locating pins 166 and 168 that properly locate the plate 60 with respect to the assembly area 170. Dowel pins 154, 156, 158, 160, 162 and 164 each have lengths that exceed the combined thickness of the plates 56 and 60 so that plate 56 may now be placed on top of plate 60 when the plate 56 is ready for assembly to plate 60.

In assembling the plates 56 and 60 at the assembly area 170, it does not matter which side surface of the plate 60 is placed upright, but it is a feature of the invention that the side surface of the mounting plate 56 that has the smaller marginal edgings 190 be placed against the bearing plate 60 when the bearing plate 60 is positioned in the assembly area 170 as aforementioned. This is the positioning shown in FIGS. 9 and 10. In applying the plate 56 to this position on top of the plate 60, the positioning dowel pins 154, 156, 158 and 160 locate the side edges of the plate 56, while the locator pins 160 and 164 locate the ends of the plate 56 relative to the corresponding ends of the now underlying plate 60.

Further in accordance with the invention, with the plates 56 and 60 disposed as indicated in FIG. 9, each aperture 180 has spin welded therein a disc 200 that is formed from the same material as the bearing plate 60. The discs are of right cylinder configuration and have an external diameter equivalent to the diameter of the smaller marginal edgings 190 of the apertures 80 (and thus cylindrical sufacings 185). Discs 200 preferably have a thickness somewhat exceeding that of the mounting plate 56. As an illustrative example, in one practical embodiment of the invention for a plate 56 of one-eighth inch steel plate the aperture edgings 186 are approximately two inches in diameter while edgings 190 are one and seven-eighths inches in diameter; discs 200 for these apertures will thus be one and seven-eighths inches in diameter. Plate 56 is an one-eighth inch steel plate, and discs 200 for this plate may be approximately three-sixteenth inch thick, as a general rule. In this connection, as the discs 200 are spin welded in place (FIG. 10) they reduce in thickness to approximately that of plate 56, to accommodate the material flow involved, as is about to be discussed.

A further feature of the invention is that the discs 200 are applied by spin welding same into integral relation with the now upwardly facing surface 201 of bearing plate 60, which is exposed through the respective apertures 180. For this purpose, the special tool 202 shown in FIGS. 7, 8 and 9 is employed, which comprises a planar pressure disc 204 formed from a suitable tool steel that has a diameter which is at least equivalent to or is preferably somewhat in excess of the diameter of the respective polymeric discs 200, while the pressure disc 204 may be of any suitable thickness. On its undersurface 206 it is provided with a plurality of spaced prongs 208 that are equally spaced radially from the axial center 210 of the tool 204, and that are equally spaced about the circumference of the pressure disc 204. Prongs 208 have a length that approaches but is less than the thickness of the respective discs 200 that are to be spin welded into place by employing the tool 202.

The pressure disc 204 on its upper surface 212 is provided with an elongate spindle or shank 214 at its axial center 210 which is adapted for application to the gripping chuck 216 of a conventional drill press apparatus equipped to power rotate drill bits for drilling holes in metal. Such an apparatus is suitably mounted over the assembly area so that the tool 202 as applied to gripper 216 may be lowered and pressed against a disc 200 placed for spin welding purposes, as shown for instance in FIG. 9, so that the prongs 208 penetrate the disc 200 in question. With pressure being maintained on the disc 200, the tool 202 is power rotated to rotate the disc 200 in question relative to the plates 56 and 60. As rotation proceeds, the polymeric material at the interface between disc 200 and the bearing plate 60 heats up under the friction involved to the extent that along the interface involved the polymeric material fluidizes and at the same time the polymeric material making up the disc plasticizes sufficiently to deform downwardly and expand radially outwardly under the confines of the pressure disc of the rotating tool 202 to bring the marginal edges of the polymeric disc into full conformity and direct physical and pressure contact with the aperture defining surfacings 182 and 185. When this has occurred, drag on the disc 200 being worked on sufficiently loads the drill press in resisting rotation to stop rotation of the tool 202. The liquified polymeric material at the interface between the thus applied disc 200 and the bearing plate 60 quickly cools and thus solidifies under the head draw function of the heat sink provided by the bearing plate 60, whereby the disc 200 in question is now integral with the bearing plate 60 and in firm fixed and direct bearing engagement with the edge surfacings 182 and 185 of the aperture 180 to which the disc 200 has just been applied.

The tool 202 may be readily removed from the just applied disc 200 by operating the conventional drill press mechanism to lift the tool relative to the now joined together plates 56 and 60 to free the tool from the disc 200 just processed. For this purpose, plates 56 and 60 may be held against the work surface 152, either by the workman, or by suitable holddown means provided for this purpose while the assembly proceeds.

Figure 10:
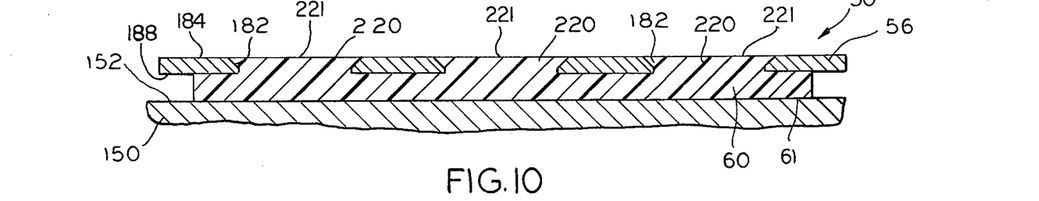
FIG. 10 is a view similar to that of FIG. 9, but showing the two basic coupler carrier components in completed assembled relation after the spin weld technique has been practiced.

Similar discs 200 are now applied in like manner to the remaining apertures 180, whereby the bearing plate 60 is now effectively affixed to bearing plate 56, as indicated in FIG. 10, with the net result that the discs 200 involved have become integral with and part and parcel of the bearing plate 60 whereby in effect the former discs 200 and bearing plate 60 are now of one piece construction and integrated with the metallic mounting plate 56. The just applied discs 200 will now take the form of flat ended studs 220 integral with bearing plate 60 that anchor the mounting plate 56 thereto, with the ends 221 of the respective studs 220 being coplanar with the underside 184 of the mounting plate 56. As previously indicated, the beginning thickness of discs 200, prior to spin welding, should be such that studs 220 have a height approximating the thickness of plate 56. Surfacings 185 avoid shear stress concentrations on studs 220 in use of carrier 50.

The number of apertures 180 that a mounting plate 56 may be provided with should be more than one, so that the plate 56 is anchored to the plate 60 in a spaced two point connection arrangement. While the apertures 180 that a plate 56 is formed with may not be of the same size, their defining surfaces 182 should be oriented as indicated in FIG. 9. However, it facilitates assembly to have the apertures 180 of the same size and the discs 200 of the same size. It is apparent, of course, that either the drill press mechanism of tool 202 may be suitably mounted for movement to operatively dispose the tool 202 for operation in the desired apertures 180, or the work table surface 152 may be suitably movably mounted for the same purpose with respect to a drill press mechanism that is not mounted for sidewise movement.

Assembled coupler plates 50 are removed from the assembly area 170 and suitably stored and packaged as needed. When applied to the car, coupler carriers 50 are mounted as indicated in FIGS. 1-6, with the mounting plate underside 184 being flush with the striker casting horizontal support surface for same that is involved.

The coupler carrier 50A is assembled in the same manner as coupler carrier 50. In the coupler carrier 50A the mounting plate 56A is shown provided with four of the apertures 180 (illustrated in outline in these figures) to which discs 200 have been applied in the manner indicated.

It will therefore be seen that the invention provides a composite coupler carrier arrangement that involves a unique combination of the polymeric bearing plate and a mounting plate therefor that is free of bonding materials or mechanical fasteners. Since the bearing plate need not be shaped to provide for its own securement to the striker casting, the bearing plate may be planar and quadrilateral in configuration and thus is free of all the special shaping requirements heretofore required for polymeric coupler shank bearing plates that limited such bearing plates to specific coupler applications.

On the other hand, the metallic mounting plate may be conveniently shaped as needed for special application purposes, and in the simplified form of FIGS. 1-6, the mounting plate is also of planar quadrilateral configuration and proportioned to have its outwardly extending ends project beyond the ends of the bearing plate, for welding of the mounting plate ends to the striker casting mounting components therefor, whether it be the stationary striker threshold section 48 of FIGS. 1-4, or the resiliently supported coupler carrier member of the arrangement shown in FIG. 6. The embodiment of FIGS. 11-13 illustrates the metallic mounting member formed for securement to striker castings of the type shown in FIGS. 1-4. However, the mounting member 56A may be shaped at its ends and edges to accommodate the various types of anchoring necessary for applying a polymeric bearing plate associated therewith to the various coupler applications in current use.

The Applicant's spin weld method of connecting together the bearing plate and mounting plate of the coupler carriers of this invention is a simple but effective means of securing together these components that are made of such different and basically incompatible materials, for securing purposes. While a drill press arrangement is preferred for performing the spin weld operation, a simple hand drill applying the tool 202 to the discs 200 in the manner described will serve the same purpose.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a railroad car wheeled for riding on track rails and having a body including a center sill projecting from one end of the car and equipped with a coupler striker casting and a coupler mounted on the center sill for swinging movement sidewise of the car, said coupler including a shank extending through the casting, with the casting including a striker portion having a striking face disposed in a vertical plane and disposed transversely of the car center line of draft and a window opening disposed transversely of and aligned with the car center line of draft through which the coupler shank extends, said casting, adjacent said face, mounting below the coupler shank and across the lower side of the window, a coupler carrier on which the coupler shank rests, with the coupler carrier including a bearing member formed from an ultra high molecular weight polyethylene of dry self lubricating characteristics that is characterized by being resistant to adherence thereto of foreign matter, said polyethylene having a molecular weight in the range of from about 3,000,000 to about 9,000,000, said bearing member defining a flat horizontally disposed load support surface on which the coupler shank rides for supporting the coupler on the coupler carrier, and means for mounting said bearing member on a horizontal support member of said striker casting, the improvement wherein:
the bearing member is of planar configuration and is coextensive in marginal configuration to said load support surface,
a metal mounting plate comprising a planar body on which said bearing member is disposed in overlying, parallel relation thereto and against one side of said plate body,
said mounting plate body defining upper and lower side surfaces that are substantially planar, and said upper side surface being at said one side of said plate body,
and means for securing said metal plate on said casting horizontal support member, with said lower surface of said plate body flush against said striker casting horizontal support member, said plate body being formed to define a plurality of spaced apart apertures of circular outline each having a side wall surfacing that is of other than right configuration whereby said apertures each form marginal edgings on either side of said plate of which one of said marginal edgings is of less diameter than the aperture other marginal edging, with said apertures being oriented such that said one of said marginal edgings thereof are at said one side of said plate, said bearing member defining stud portions integral therewith that are respectively coextensive with said apertures, respectively, and that have their respective side walls conformed to, and in direct physical bearing relation with, the respective aperture side wall surfacings, said stud portions each defining an end surface that is substantially coplanar with said plate body lower surface for flush fitting of said stud portion ends with the striker casting horizontal support member, whereby said bearing member may be made fast to said mounting plate body free of bonding materials or mechanical fasteners.

2. The improvement set forth in claim 1 wherein:

said metal plate is planar in configuration, and the configuration of said apertures is frustoconical, said metal plate and said bearing member extending lengthwise of the window opening on said horizontal support member with said bearing member being of shorter length dimension, lengthwise of the window opening, than the corresponding length of said plate and being centered on said plate whereby said plate at its ends projects sidewise of the car center line of draft beyond said bearing member, said means for mounting said metal plate on said casting horizontal support member being located at said ends of said plate.

3. The improvement set forth in claim 3 wherein:

said plate at its said ends is welded to said casting horizontal support member to form said mounting means, and said bearing member is of quadrilateral configuration in the plane of same.

4. The improvement set forth in claim 1 wherein:

said metal mounting plate and said bearing member extend lengthwise of the window opening on said casting horizontal support member with the opposite ends of said metal mounting plate being disposed adjacent the sides of the window opening, said metal mounting plate at its said ends defining lateral tabs on the inner and outer edges of same shaped to engage the respective inner and outer sides of said casting horizontal support member to form said mounting means, with the configuration of said aperture side wall surfacing being frusto-conical, and said bearing member being of quadrilateral configuration in the plane of same.

5. The improvement set forth in claim 1 wherein said casting adjacent said face has a cage portion defining a coupler carrier chamber, and a coupler carrier mounting member is resiliently mounted in said chamber that defines a flat horizontally disposed load support surface forming said casting horizontal support member, the further improvement wherein said plate is mounted on said mounting member surface by said mounting means, for mounting said coupler carrier on said casting.

* * * * *